Patented July 29, 1930

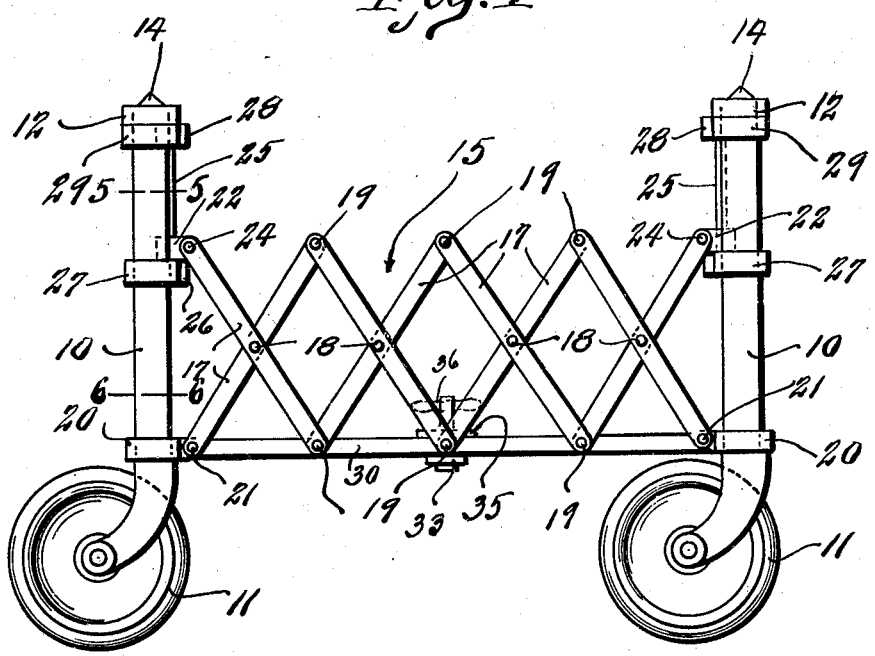
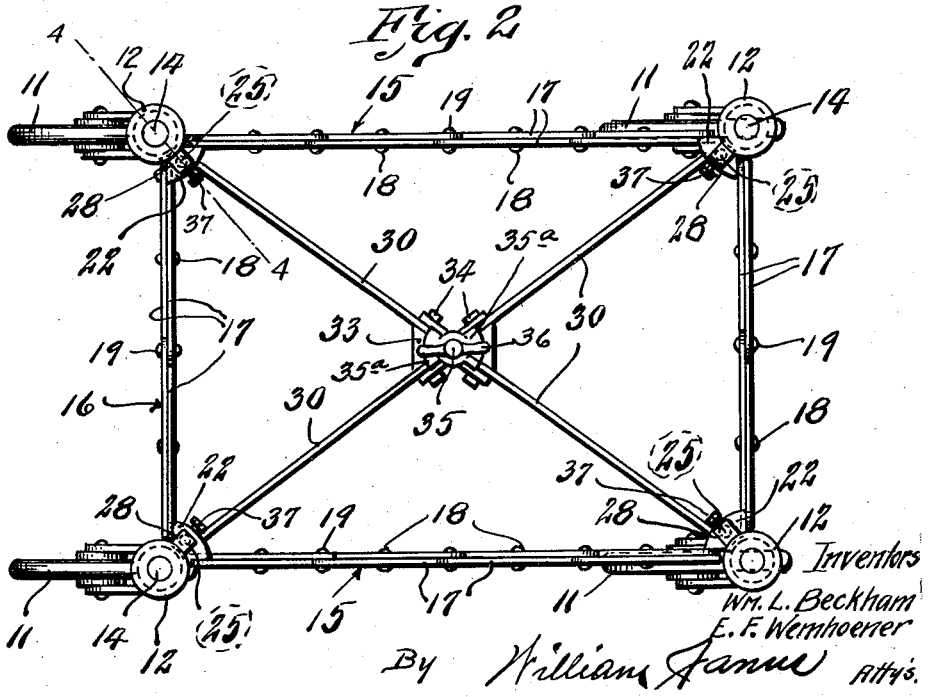

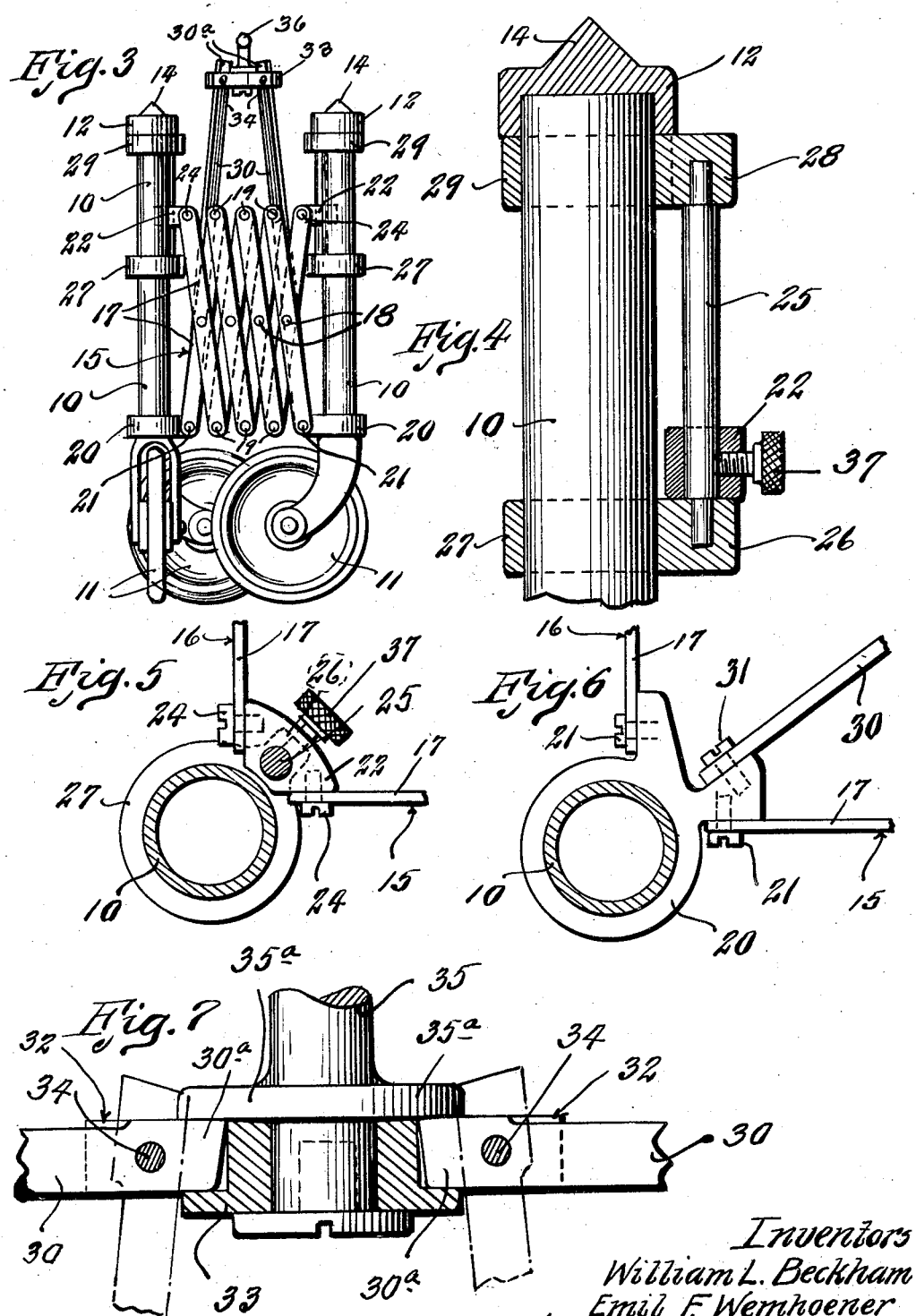

1,771,836

UNITED STATES PATENT OFFICE

WILLIAM L. BECKHAM AND EMIL F. WEMHOENER, OF ST. LOUIS, MISSOURI

CASKET CARRIAGE

Application filed August 22, 1928. Serial No. 301,396.

This invention relates to new and useful improvements in casket carriages for undertakers. This type of carriage is usually made collapsible so that it can be folded compactly when not in use or for transportation purposes. In this construction the corner posts which are carried on casters are interconnected by suitable lazy tongs arrangements whereby said posts can be moved in a horizontal plane either into an extended casket supporting position or inward into a collapsed position. Each end of the lazy tongs mechanism terminates in a pair of arms, the end of one of which has a fixed pivotal engagement with the corresponding post, while the end of the other arm is pivotally fixed to a collar which is slidably mounted on said post. Thus the movement of the posts relatively to each other contracts or expands said lazy tongs connection, causing the loose collars to slide on the posts. As the diameter of the post is comparatively large, the pivotal connection between the lazy tongs mechanism and the sliding collar is located a considerable distance from the axis of said collar. Consequently the strains applied to said collar at a single point in contracting and expanding said lazy tongs mechanism cause said collar to tilt and bind on the post, thereby impairing the efficient operation of the device. Furthermore, there is considerable friction produced due to the large bearing surfaces of the collars. The collars cannot be made to form a too loose fit as the danger of binding would be increased and, on the other hand, a close fit increases the friction.

It is one of the objects of the present invention to eliminate these difficulties and provide a carriage which is easy to operate and in which the danger of binding of the sliding collar is reduced to minimum.

Other objects of the invention are to provide a separate guide member for the movable ends of the lazy tongs mechanism whereby the peripheral surfaces of the post do not affect the operation of the slidable member.

Further objects of the invention are to mount rigidly on each post a guide rod disposed in spaced parallel relation therewith for receiving a slidable member of the lazy tongs connection. This guide rod is of comparatively small diameter in order to reduce the friction and bring the pivotal connection of the lazy tongs mechanism as close as possible to the axis of said rod so as to reduce the danger of binding.

Still other objects of the invention are to provide simple and efficient means for operatively interconnecting said posts whereby the device can be operated with ease and locked in expanded position.

Additional objects of the invention are to generally improve upon and simplify the construction of casket carriages and provide simple mechanism for efficiently operating the same.

With these and other objects in view, our invention consists in certain novel features of construction and arrangement of parts, hereinafter more fully described and claimed, and illustrated in the accompanying drawings, in which—

Figure 1 is a side elevational view of the carriage showing the latter in expanded position.

Figure 2 is a top plan view of same.

Figure 3 is a side elevational view of the carriage when in contracted position.

Figure 4 is an enlarged vertical cross section taken on line 4—4 of Figure 2.

Figure 5 is an enlarged horizontal cross section taken on line 5—5 of Figure 1.

Figure 6 is an enlarged horizontal cross section taken on line 6—6 of Figure 1.

Figure 7 is an enlarged detail view of the means utilized for locking the carriage in expanded position.

Referring by numerals to the accompanying drawings, 10 indicates corner posts preferably of tubular construction and provided at their lower ends with casters 11. The upper end of each post is provided with a cap 12 having an upwardly projecting pointed end 14 which is designed to bite into the bottom of the casket and hold the latter in position on the carriage.

The corner posts are interconnected by a side lazy tongs mechanism 15 and a lazy tongs mechanism 16, by means of which said posts can be moved either into expanded position, as shown in full lines in Figure 2 or into contracted positions as shown in Figure 3.

Each of said lazy tongs mechanisms comprises a series of arms 17 arranged in pairs, each of which is pivotally interconnected intermediate their ends as at 18, while the adjacent ends of the arms are pivotally connected as at 19. The lower end of the last pair of arms of each lazy tongs mechanism is pivotally connected to a collar 20 as indicated at 21, while the upper end of said pair of arms is pivotally connected to a slidable member 22, as indicated at 24. Collars 20 are fixed to posts 10, preferably near the lower ends thereof, and consequently the pivots 21 have fixed relation with respect to said posts.

Each member 22 is slidably arranged on a guide rod 25 which is disposed in spaced parallel relation with each post 10, preferably intermediate the pivots 24 of the lazy tongs mechanisms. The lower end of each rod 25 is secured in an inward horizontal extension 26 of a collar 27 which latter is fixed to each post 10. The upper end of rod 25 is similarly anchored in an inward and horizontally disposed extension 28 of a collar 29, which latter is fixed to each post 10 near the upper end thereof. Thus members 22 are free to move in vertical planes in parallelism with the axis of posts 10 and thus form guides for the movable pivotal connections 24 of the lazy tongs mechanisms. As rods 25 are of comparatively small diameters, the friction produced by the sliding members 22 is negligible and does not affect the efficient operation of the device.

The pivotal connections 24 are located close to the axis of each rod 25 and are substantially located at diametrically opposite points, thereby eliminating all danger of binding on the part of the slidable member. Furthermore, posts 10 can be finished in any suitable manner as there are no moving parts located on the posts, and consequently there is no danger of injuring such finish.

The lower collar 27 of each post has pivotally connected thereto one end of a link 30 as indicated at 31. Each of said links extends inwardly and diagonally from each post and has its inner end pivotally mounted in the upwardly opening notch 32, of a centrally located member 33, as indicated at 34. These links form toggle connections which, when member 33 occupies a downward position, lock posts 10 in expanded positions and prevent accidental movement or displacement thereof. Links 30 have their inner ends 30ª projecting beyond pivots 34 and member 32 is provided with a locking member 35. This member 35 is revolubly mounted and is provided with quadrant extensions 35ª which are adapted to overhang notches 32 and prevent upward movement of ends 30ª. By virtue of this arrangement, member 35 can be given a quarter turn to lock ends 30ª in said notches, thereby retaining links 30 in extended positions. This locking member 35 is revolubly mounted in member 32 and is provided with a handle 36 by means of which said member 35 can be turned. Handle 36 also provides convenient means for raising and depressing member 32.

In addition to the above mentioned locking means, each sliding block 22 may be provided with a screw 37 which can be manually turned to engage rod 25 and lock said block 22 in position.

Undertakers' carriages of our improved construction can be easily operated at all times, can be securely locked in position, and can be folded into a compact size occupying very little space.

It is to be understood that various changes in the construction and arrangement of parts of our improved device can be made and substituted for those herein disclosed, without departing from the spirit of our invention and the scope of our claims.

We claim:

1. A casket carriage comprising in combination corner posts, lazy tongs mechanism connecting each pair of posts, fixed means for pivotally mounting the end of one arm of each end of said mechanism in fixed spaced relation with the corresponding post near the lower end thereof, a pair of collars fixed to the upper end of each post in spaced relation with each other and provided with obliquely extending extensions having oppositely disposed seats, a rod having its ends secured in said seats and disposed in parallel spaced relation with said post, a collar slidably mounted on each rod and provided with a diagonal extension having vertical walls disposed at right angles to each other, each of which has formed therein a horizontally disposed seat, a horizontally disposed member arranged in each seat and forming a pivotal mounting for the end of the other arm of each end of said mechanism, diagonal arms pivotally connected at their outer ends to the respective posts, and means having a pivotal engagement with the inner ends of all of said arms for simultaneously actuating the latter to actuate all of said posts.

2. A casket carriage comprising corner posts, lazy tongs mechanism connecting each pair of posts, means for pivotally mounting the end of one arm of each end of said mechanism in fixed relation with the corresponding post, a member fixed in parallel spaced relation with said post remotely from said fixed pivotal end of the first-mentioned arm, means for pivotally and slidably mounting the end of the other arm of each end of said mechanism on said slidable member, arms pivotally connected at one of their ends to said posts and extending inwardly and diagonally therefrom, a member disposed centrally of said posts and having connected pivotally thereto the inner ends of said diagonal arms, thereby forming toggle mechanism for retaining said posts in expanded positions, and means on said central member and engageable with said inner ends for locking said diagonal arms in extended positions.

3. In a casket carriage, the combination with corner posts and a plurality of lazy tongs mechanisms connecting the same, of a collar fixed to each post near the lower end thereof, means for pivotally connecting the ends of one arm of each end of said mechanisms thereto, a pair of spaced collars fixed to each post near the upper end thereof, said collars having diagonally and inwardly disposed extensions, each of which is provided with an inwardly arranged seat, a guide rod having its ends secured in the seats of said extensions and being held by said collars in spaced parallel relation with said post, a member slidably mounted on said guide rod, said member being provided with vertically disposed faces arranged at right angles to each other, and means for pivotally connecting the ends of the other arms of the ends of said mechanisms to the respective vertical faces of said member whereby the corresponding ends of the adjacent mechanisms are pivotally mounted at right angles to each other and in the same horizontal plane.

In testimony whereof we hereunto affix our signatures this 14th day of May, 1928.

WILLIAM L. BECKHAM.
EMIL F. WEMHOENER.